May 3, 1955
J. R. SIBLEY
2,707,522
CRAWLER TREAD PLANETARY GEAR DRIVE
Original Filed July 5, 1949
2 Sheets-Sheet 1
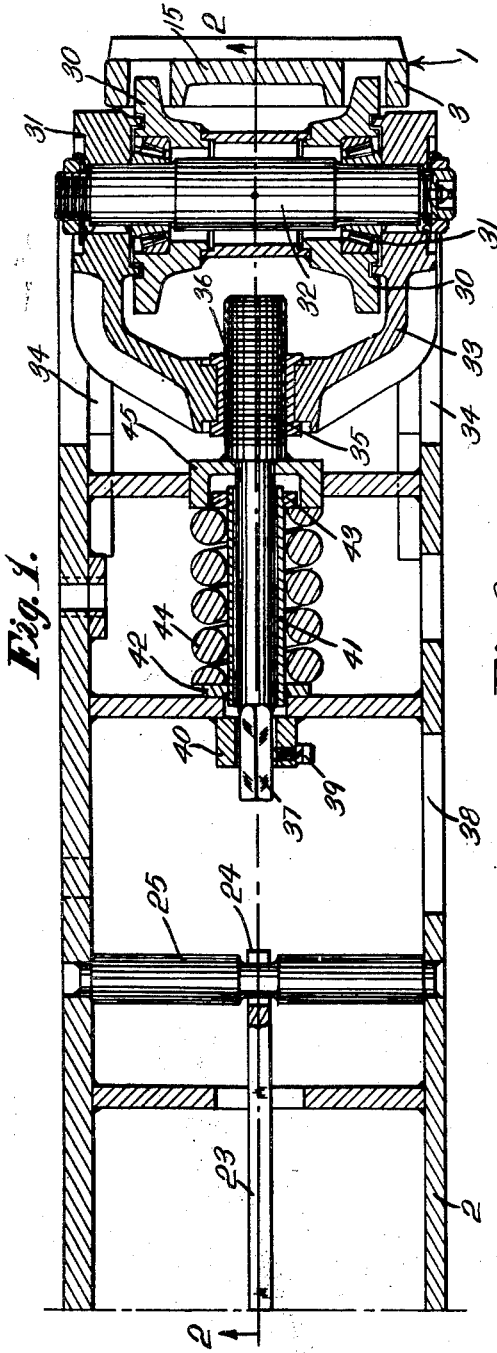
Inventor:
John R. Sibley.
by Charles F. Osgood,
Attorney.

May 3, 1955 J. R. SIBLEY 2,707,522
CRAWLER TREAD PLANETARY GEAR DRIVE
Original Filed July 5, 1949 2 Sheets-Sheet 2
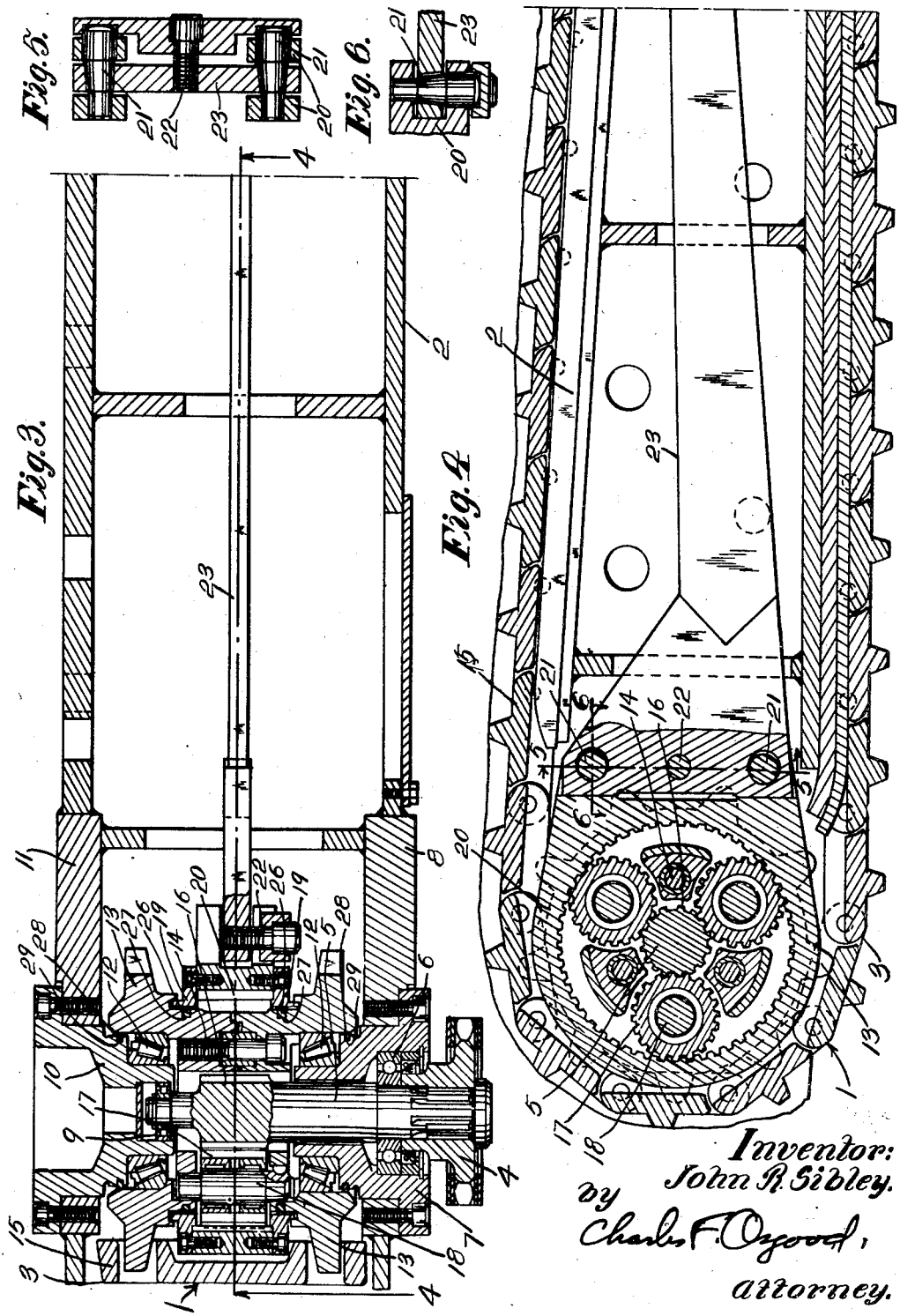
Inventor:
John R. Sibley,
by Charles F. Osgood,
attorney.

United States Patent Office 2,707,522
Patented May 3, 1955

2,707,522

CRAWLER TREAD PLANETARY GEAR DRIVE

John R. Sibley, Franklin, Pa., assignor to Joy Manufacturing Company, Pittsburgh, Pa., a corporation of Pennsylvania Original application July 5, 1949, Serial No. 102,996. Divided and this application March 14, 1951, Serial No. 215,562

12 Claims. (Cl. 180—9.1)

This invention relates to tractor bases and more particularly to drive gearing for driving the endless crawler treads of a tractor base.

An object of this invention is to provide an improved tractor base. Another object is to provide improved means for driving the crawler treads of a tractor base. Yet another object is to provide an improved tread driving means including reduction gearing arranged within the orbits of the crawler treads whereby the latter may be driven at a relatively low speed. A further object is to provide an improved planetary driving gearing for a crawler tread. These and other objects and advantages of the invention will, however, hereinafter more fully appear.

This application is a division of my copending application Serial No. 102,996, filed July 5, 1949.

In the accompanying drawings there is shown for purposes of illustration one form which the invention may assume in practice.

In these drawings:

Fig. 1 is a horizontal sectional view taken through the forward portion of a tractor base in which a preferred illustrative embodiment of the invention is incorporated.

Fig. 2 is a longitudinal vertical section taken on line 2—2 of Fig. 1.

Fig. 3 is a horizontal sectional view taken through the rearward portion of the tractor base, showing the improved driving gearing.

Fig. 4 is a longitudinal vertical section taken on line 4—4 of Fig. 3.

Fig. 5 is a detail vertical section taken on line 5—5 of Fig. 4.

Fig. 6 is a detail horizontal section taken on line 6—6 of Fig. 4.

The improved tractor base includes a base frame supported at its sides by crawler devices as is fully disclosed in my copending application, Serial No. 102,996, above referred to, and since the crawler devices are similar in design, a detailed description of one will suffice for both.

The crawler devices are each generally designated 1, and each, as shown in the drawings, comprises a tread frame 2 about which an endless crawler tread 3 is guided for orbital circulation. A motor driven sprocket 4 (Fig. 3) is keyed to a transverse horizontal shaft 5 which is journaled at its outer end in a bearing 6 supported within a bearing support 7 secured to the outer wall 8 of the tread frame at one end portion of the latter. The inner end of this shaft is journaled in a bearing 9 supported by a bearing support 10 attached, as by screws, to the inner wall 11 of the tread frame. The bearing supports 7 and 10, at their inner portions, support bearings 12 on which drive sprockets 13 are journaled, and the hubs of these drive sprockets are secured together, as by screws 14, to provide a unitary sprocket structure. These chain sprockets 13 engage and drive the pivoted link chain 15 of the endless crawler tread. Formed on the shaft 5 is a spur gear 16 which meshes with planet gears 17, herein desirably three in number, journaled on bearings supported by shafts 18 having their ends secured in bores in the sprocket-hubs. Surrounding the sprocket-hubs are the hub portions 19 of an internal gear 20, with which the planet gears 17 mesh, as shown in Figs. 3 and 4. Secured, as by wedge pins 21 and screws 22, to the internal gear is an elongated arm or lever 23 which extends longitudinally within the tread frame and which is formed with a forked or slotted outer end 24 slidingly engaging a transverse pin 25 suitably rigidly secured within the sidewalls of the tread frame, as shown in Fig. 1. The lever 23 is at least five times greater in length than the diameter of the internal gear 20 and serves to hold the internal gear 20 against rotation so that when the gear 16 is driven, the planet gears roll around the stationary internal gear as a trackway, causing rotation of the chain drive sprockets 13 to effect drive of the crawler tread.

It has been noted above that the hub portions 19 of the internal gear 20 surround the sprocket hubs. There is provided between these parts sufficient clearance so that the internal gear is located or positioned by engagement with the teeth of the planet gears 17, and not by engagement of its hub portions with the sprocket hubs. This arrangement is adopted, with the construction illustrated, both because of the difficulty of securing perfect concentricity of various parts about the axis of the shaft 5, and because of the difficulty of arranging for mounting the internal gear rigidly upon the stationary frame structure. The internal gear must, however, be held against rotation, and if it be held against rotation by connecting one portion of its periphery, as by a short fork or link, to a cross pin extending between the side walls of the tread frame 2, there will be very unequal distribution of gear load among the several planets. If an arm of infinite length were employed the gear load distribution would be, practically speaking, uniform or equal. By making the arm 23 relatively long, it is possible to bring the difference in the gear loads at the different planets within reason, as, for example, to prevent the ratio between maximum and minimum load exceeding 1.5, whereas with a short arm the ratio might be entirely prohibitive. The matter may be visualized by considering a case where but two planets were used, diametrically opposite each other, an arrangement that would be unsatisfactory for centering the internal gear, but which allows of simple mechanical analysis. If the radius of the pitch circle of the internal gear be denominated $r$ and the radial distance from the center of the internal gear to its remote point of reaction through the lever be denominated $R$, then, when the axes of the planets are disposed in the same plane with the axis of the pin 25, the ratio of the pitch line load upon the planet nearer the pin 25 to the pitch line load upon the planet farther from the pin 25 is essentially equal to $$\frac{R+r}{R-r}$$

Accordingly, by making $R$ as much larger than $r$ as is practically possible, the use of the planets to center the internal gear may be possible without over stressing the gearing. Thus, with the long lever arm 23 an improved distribution of load on the planet gears 17 during tread drive is attained, and the slotted or forked end of the lever 23, which holds the internal gear against rotation, permits the internal gear to "float" thereby to adjust itself slightly with respect to the planet gears.

In this improved construction, sealing rings 26, seated in annular grooves 27, in the sprocket hubs, engage the inner peripheries of the hub portions 19 and similar sealing rings 28 seated in grooves 29 on the bearing supports 7 engage the inner peripheries of the sprocket hubs, to maintain a seal, thereby to retain lubricant within the gearing chamber. The sealing rings 26 maintain a seal with the hubs of the internal gear in all positions of lateral movement of the internal gear relative to the planet gears, in an obvious manner.

The chain 15 of the crawler tread is guided for circulation within a guideway on the tread frame, and at the opposite end portion of the tread frame it passes around an idler sprocket 30 (Figs. 1 and 2) journaled on bearings 31 supported by a transverse shaft 32 suitably secured within the side walls of a U-shaped front idler bracket 33. The idler bracket is guided for longitudinal adjustment in a guideway 34 formed in the side walls of the tread frame, and an adjusting screw 35 threadedly engages, at 36, a bushing in the idler bracket. Screw 35 has a polygonal rear end portion 37, engageable by a suitable turning instrument and accessible through a side opening 38 in the side wall of the tread frame. A screw 39, threaded within a boss 40 integral with the tread frame, serves to hold the adjusting screw in adjusted position. Surrounding the adjusting screw is a sleeve 41, and encircling this sleeve and acting between relatively adjustable collars 42 and 43, the former fixed to the sleeve and engageable with the tread frame and the latter threaded on the sleeve, is a coil spring 44 which may be placed under a desired precompression. The screw 35 has a collar 45 fixed to it, and also adapted to be caused to engage the end of the spring 44. Evidently, by rotating the screw, the collar 45 may be caused just to engage (or to be right next to) the end of the spring 44 when the bracket 33 is in desired position, in such a manner that the spring can provide a yieldable positioning means for the sprocket, without constantly exerting its force on the crawler tread.

As a result of this invention, an improved tractor base is provided having improved driving means whereby the treads may be driven at a relatively low speed. By arranging the reduction gearing within the orbits of the crawler treads a substatnial speed reduction is obtained, while resulting in a structure which is relatively compact. By the provision of the novel planetary gearing, together with the associated lever arm, a substantially uniform or equal distribution of load on the planet gears is obtained, resulting in a planetary gearing which is extremely rugged as well as compact. The particular location of the planetary gearing and the manner of housing the same provides for adequate lubrication of the gears while the possibility of leakage of lubricant is substantially avoided. The gearing is not only rugged and compact in design but is also comparatively simple in structure, well adapted for its intended purpose. These and other advantages of the invention will be clearly apparent to those skilled in the art.

While there is in this application specifically described one form which the invention may assume in practice, it will be understood that this form of the same is shown for purposes of illustration and that the invention may be modified and embodied in various other forms without departing from its spirit or the scope of the appended claims.

What I claim as new and desire to secure by Letters Patent is:

1. A tractor base comprising an endless crawler tread, a tread frame by which said endless tread is guided for orbital circulation, means for driving said tread comprising planetary driving gearing arranged within the orbit of said tread including a sun driving gear, equally spaced planet gears meshing therewith, a rotatable carrier for said planet gears journaled for rotation in coaxial relation with said sun gear and operatively connected to the tread, an internal gear with which said planet gears mesh, and means for mounting said internal gear for limited floating movement with respect to said planet gears to permit said internal gear to move bodily relative to said planet gears so that said internal gear may freely assume its own center substantially coaxial with said sun gear during tread drive thereby to improve the load distribution on the planet gears, said mounting means comprising an elongated lever arm extending longitudinally of said tread frame within the tread orbit and secured to said internal gear and means for loosely connecting the remote end of said lever arm to said tread frame to cause said arm to hold the internal gear against rotation while providing for such adjusting floating movement thereof.

2. In combination, a frame, a driven element journaled on said frame, a drive shaft journaled on said frame in coaxial relation with said driven element, and planetary reduction gearing between said drive shaft and said driven element including equally spaced planet gears mounted to revolve bodily with said driven element about the axis of the latter, a non-rotating internal gear with which said planet gears mesh, a gear driven by said shaft and meshing with and driving said planet gears whereby the latter roll about said internal gear as a trackway to effect drive of said driven element, and a mounting structure for said internal gear on said frame providing for limited bodily floating movement of said internal gear relative to said planet gears in transverse planes at right angles to the axes of said planet gears to effect substantially equal load distribution on said planet gears, said mounting structure for said internal gear including an elongated lever rigidly secured to said internal gear for holding the latter against rotation and extending longitudinally of said frame away from said planetary gearing and a motion providing connection between the remote end of said lever and said frame to provide for limited bodily relative movement of said lever.

3. The combination as set forth in claim 2 wherein said motion providing connection comprises a pin secured to said frame and a slot in said end of said lever and in which said pin is received whereby said lever may have limited bodily movement relative to said pin.

4. A tractor base comprising, in combination, a tread frame, an endless crawler tread guided for orbital circulation about said tread frame, and driving means for said tread including reduction gearing carried by said tread frame within the orbit of said crawler tread and including a driven gear, equally spaced planet gears driven by said gear and operatively connected to said tread, an internal gear with which said planet gears mesh, and a structure for movably mounting said internal gear on said frame to provide for limited bodily movement of said internal gear relative to said planet gears in transverse planes at right angles to the axes of said planet gears thereby to evenly distribute the load on said several planet gears.

5. A tractor base comprising, in combination, a tread frame, an endless crawler tread guided for orbital circulation about said tread frame, a transverse drive shaft journaled within said tread frame at one end portion of the latter, a sprocket journaled on said tread frame in coaxial relation with said shaft and drivingly engaging said tread, equally spaced planet gears mounted on said sprocket, a non-rotating internal gear with which said planet gears mesh, a gear secured to said drive shaft and meshing with and driving said planet gears to cause the latter to roll around said internal gear as a trackway thereby to effect drive of said sprocket, and means for movably mounting said internal gear on said tread frame to provide for limited bodily movement of said internal gear relative to said planet gears in transverse planes at right angles to the axis of said driving shaft thereby to distribute the driving load substantially evenly on said several planet gears.

6. A tractor base as set forth in claim 5, wherein said means for movably mounting said internal gear includes an elongated lever secured to said internal gear and extending longitudinally of said tread frame within the tread orbit, and a connection between the outer end of said lever and said tread frame near the end portion of the latter opposite from said end portion which carries said drive shaft, said connection providing for limited relative motion between said lever-end and said frame.

7. A tractor base as set forth in claim 5, wherein said means for movably mounting said internal gear on said tread frame includes a movable connection with said frame at a point remote from said internal gear.

8. A crawler tread driving means as set forth in claim 1 wherein said lever arm is several times greater in length than the diameter of said internal gear and said means for loosely connecting said lever arm to said tread frame is located at the end of the latter remote from said planetary driving gearing.

9. A tread driving means as set forth in claim 1 wherein said lever arm is at least five times greater in length than the diameter of said internal gear and said means for loosely connecting the lever arm to said tread frame is located at the end of the latter remote from said planetary driving gearing.

10. In combination, a frame structure, a rotatable carrier journaled on said frame structure, a plurality of equally spaced planet gears journaled on said carrier, an internal gear with which said planet gears mesh, a coaxial gear meshing with said planet gears for driving the latter, and means for mounting said internal gear for limited bodily floating movement with respect to said frame structure in transverse planes perpendicular to the axis of rotation of said internal gear to permit said internal gear freely to assume its centered position substantially coaxial with said driving gear during drive thereby to improve the load distribution on said planet gears, said mounting means comprising an elongated lever arm projecting radially a substantial distance with respect to said internal gear and secured to the latter for holding said internal gear against rotation, and means for loosely connecting the end of said lever arm remote from said internal gear to said frame structure to cause said lever arm to hold said internal gear against rotation while providing for such bodily floating movement thereof.

11. A combination as set forth in claim 10 wherein said means for loosely connecting said lever arm to said frame structure to permit such bodily floating movement of said internal gear is arranged between said arm and said frame and includes a pin and slot connection located with respect to said frame structure at a point remote from the planetary driving gearing.

12. A driving mechanism for an endless crawler chain comprising a frame, a chain driving element journaled on said frame, planetary reduction gearing for driving said element comprising a sun driving gear, equally spaced planet gears meshing with said sun gear, a rotatable carrier for said planet gears journaled for rotation on said frame in coaxial relation with said sun gear and operatively connected to said element, an internal gear with which said planet gears mesh, and means for mounting said internal gear on said frame for limited floating bodily movement relative to said planet gears in transverse planes at right angles to the axes of said planet gears to enable said internal gear freely to assume its own center coaxial with said sun gear during drive of said element to equalize the load distribution on said planet gears, said mounting means including an elongated lever arm rigidly secured to said internal gear and extending longitudinally in a direction at substantially right angles to the sun gear axis and a connection between the end of said lever remote from said planetary gearing and said frame to hold said internal gear against rotation by said lever while providing for such floating bodily movement of said internal gear.

References Cited in the file of this patent
UNITED STATES PATENTS

| | | |
|---|---|---|
| 955,201 | Rand | Apr. 19, 1910 |
| 1,234,689 | Peterson | July 24, 1917 |
| 1,413,147 | Wickersham | Apr. 18, 1922 |
| 1,586,309 | Hult | May 25, 1926 |
| 2,027,655 | Stoeckicht | Jan. 14, 1936 |
| 2,311,143 | Wahlberg | Feb. 16, 1943 |
| 2,335,544 | Schnetzer | Nov. 30, 1943 |
| 2,427,407 | Hill | Sept. 16, 1947 |

FOREIGN PATENTS

| | | |
|---|---|---|
| 164,079 | Great Britain | May 31, 1921 |